United States Patent [19]
Hazar

[11] 3,839,796
[45] Oct. 8, 1974

[54] PROSTHETIC DENTURE AND METHOD
[76] Inventor: James M. Hazar, 3120 N. Rose Cir., Phoenix, Ariz. 85018
[22] Filed: Oct. 10, 1972
[21] Appl. No.: 296,143

Related U.S. Application Data
[63] Continuation-in-part of Ser. No. 235,376, March 16, 1972, abandoned.

[52] U.S. Cl. ................................................ 32/2
[51] Int. Cl. ........................................... A61c 13/00
[58] Field of Search ............................. 32/2, 8, 11

[56] References Cited
UNITED STATES PATENTS
3,083,459   4/1963   McMurray et al. ..................... 32/2
3,727,309   4/1973   Huey ..................................... 32/2

Primary Examiner—Robert Peshock

[57] ABSTRACT

A prosthetic denture comprising: an assembly of prosthetic teeth having a hard base prosthetic gum structure cast and bonded thereto; said prosthetic gum structure having a recess adapted to align generally with a toothless human gum area; a deflectably formable soft layer in said recess; said soft layer having a conforming recess adapted generally to fit a human gum area; the marginal edges of said soft layer bonded to said prosthetic base gum structure; an impression formed layer of hardenable material covering said soft layer of deflectably formable material; the disclosure also relating to methods of producing and fitting the aforementioned dentures.

5 Claims, 15 Drawing Figures

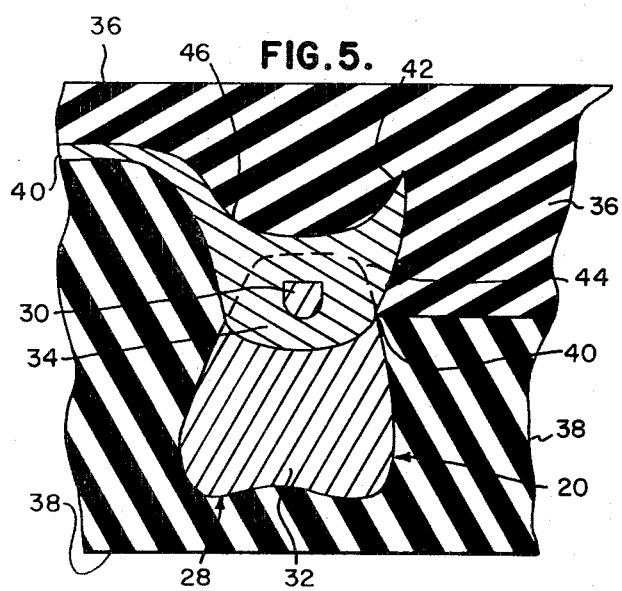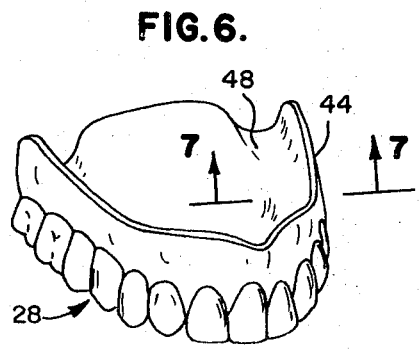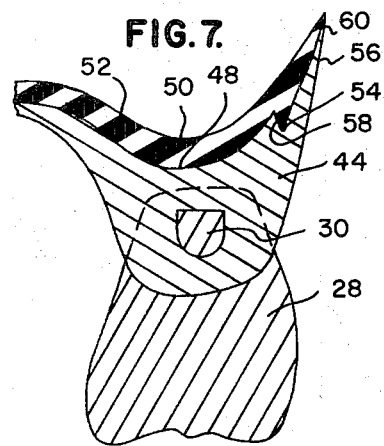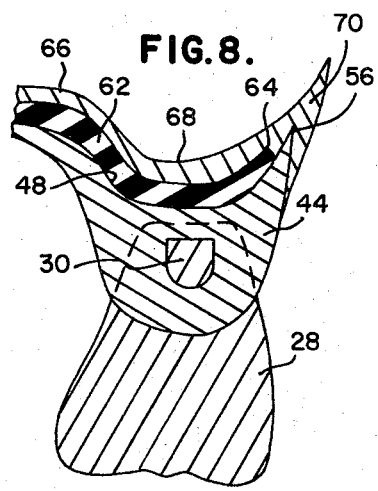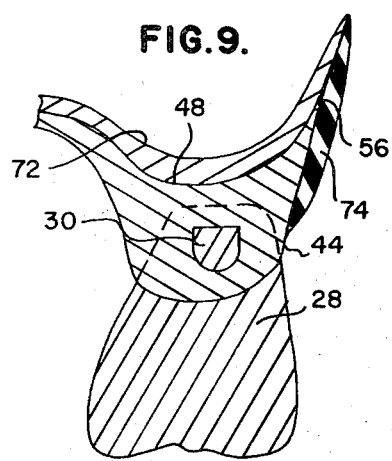

PROSTHETIC DENTURE AND METHOD

This application is a continuation in part of applicant's co-pending application, Ser. No. 235,376, filed Mar. 16, 1972, for Prosthetic Denture and Method and now abandoned.

BACKGROUND OF THE INVENTION

Various prosthetic dentures have been produced by setting groups of individual teeth in hard base structures and final impression fitting of such hard base structures have been generally performed by inserting the hard base structure into the mouth of a patient with various impression taking materials and subsequently the impressions are utilized for producing a suitable recess adapted to precisely fit a toothless gum area of a patient from which the impression is taken.

Various attemps have been made to provide economical prosthetic dentures and some of them have utilized elastomeric material surrounding prosthetic teeth, however it has been found that deflection of the elastomeric material around the teeth permits food to become disposed between the elastomeric material and the prosthetic teeth during the mastication of various foods when the denture is utilized for such purposes in the human mouth. It is now obvious that elastomeric material which is not intimately bonded to an assembly of prosthetic teeth permits food to become disposed in many areas between the elastomeric prosthetic gum structure and the prosthetic teeth during mastication, and due to the fact that the elastomeric material tends resiliently to hold the particles in the recesses adjacent the teeth, they are very difficult to keep clean and to maintain them free of bacterial growth and other undesirable conditions.

Heretofore, impressions of a toothless gum area have been made and it has been common practice to produce hard base dentures in accordance with such impressions; however, due to the mass of material involved in producing a hard base denture, it has been difficult to allow such hard base material to cure in a person's mouth in an impression taking position, and thus costly and complex methods have always been resorted to in the production of a prosthetic denture. Many of the plastic materials which are hardenable are utilized for producing a prosthetic gum structure adjacent to prosthetic teeth and due to the structural mass requirements the amount of plastic material to be cured in connection with the prosthetic teeth is such as to cause discomfort of a patient and thereby preventing the complete impression taking and curing of the hard base structure in a patient's mouth.

Additionally, the prior art has employed elastomeric material which is curable at a low temperature in a person's mouth for taking impressions therein, and many such materials are only intimately bondable to a like material but not readily bondable to a hard base plastic material such as an acrylic material or the like. Dentures produced in this manner have encountered functional difficulties hereinbefore described, in that the food particles are collected between the elastomeric material and the prosthetic teeth during mastication of food in the mouth of a person wearing such prior art prosthetic dentures.

Some prior art prosthetic dentures have been produced with hard rigid palate portions adapted to be placed adjacent the palatal vault of a person's mouth and due to the various configurations of persons' mouths, these hard palate portions have been unsatisfactory since in many cases relatively thick liners have caused the hard palate area to become quite thick, which tends to create speech as well as mastication problems.

SUMMARY OF THE INVENTION

The present invention relates to a novel prosthetic denture and a method for producing such dentures. The invention comprises an assembly of individual teeth or an assembly of integral cast prosthetic teeth which are bonded at their upper gum simulating areas to a hard base structure such as a compatible acrylic which will bond intimately to the teeth, which may be of like material, and a deflectably formable layer on the hard base layer provides for a recess adapted generally to conform to the toothless gum area of a patient, and means is provided for bonding or sealing the marginal edges of the deflectably formable layer to the hard base acrylic or other material so that a complete artificial denture, according to the invention, may be finally fitted to the patient's mouth by curing the deflectably formable material for the final impression fitting within the mouth, and whereby the bonding of the marginal edges of the deflectably formable material to the hard base material prevents food particles from entering between areas of the prosthetic teeth and the hard base denture, or between the hard base material and the deflectably formable material forming a liner therefor.

Another species of the invention comprises an assembly of integral cast prosthetic teeth having a hard base structure bonded to the upper portions thereof and having a first layer of deflectably formable material formed generally to fit a toothless gum area of a patient and a second layer overlaying the deflectably formable layer, the second layer being a hard plastic bondable to the hard deflectably formable material, and this hard plastic, being quite thin, is subject to taking of an impression in a person's mouth of that person's toothless gum area while the second layer is in soft condition but activated to become hardened and the peripheral areas of the second layer bond to the first deflectably formable layer and are bonded to the hard base material so as to encapsulate the second deflectably formable layer and prevent any collection of food particles between the hard base of the denture and the deflectably formable layer.

The preferred embodiment of the invention comprises a prosthetic denture having a hard base bonded to an assembly of prosthetic teeth, and the hard base carries a soft palate which includes a soft layer of deflectably formable material adapted generally to fit the upper toothless gum area of a patient, and the soft palate being of deflectably formable material is capable of being heated and/or deflectably formed within the patient's mouth, subsequent to which a hard liner is cast on the soft palate within the person's mouth to provide a relatively thin hard palate in the palatal vault of the patient.

The preferred embodiment of the invention also comprises the production of several sizes of prosthetic dentures which include an assembly of prosthetic teeth bonded to a hard base prosthetic gum structure and whereon a soft deflectable layer is also bonded to the hard base so that the soft deflectable layer may initially be deflectably formed in a person's mouth generally to fit the features of the toothless gum area of the patient, whereupon a hard liner may subsequently be cast in the deflectably formed soft layer to precisely fit the toothless gum area of the patient's mouth.

The invention also comprises a novel method wherein a cast assembly of integral prosthetic teeth are bonded to a hard base structure and an impression layer of hardenable hard plastic material is retained on said hard base during the taking of an impression in a human mouth by means of a surrounding elastomeric layer which is cured on the hard base preliminary to the impression taking operation.

The preferred method of the invention comprises the casting of a hard base prosthetic gum structure about an assembly of prosthetic teeth such that the prosthetic teeth are rigidly bonded to the hard base prosthetic gum structure, then a soft deflectably formable layer is cast on the hard base gum structure so as generally to conform to a human toothless gum area whereupon the soft layer of material may be deflectably formed in a person's mouth to a set condition so as to quite closely conform to the toothless gum area in the patient's mouth; in order to deflectably form the soft layer it may be heated slightly, as in hot water, so that it may readily be deflected into conformance with the features of the toothless gum area in the patient's mouth, whereupon the soft layer may then be cooled and hardenable acrylic or other suitable material may be placed on the deflectably formed soft layer and then reinserted into the patient's mouth and left until the last mentioned layer of material has hardened into a hard, rigid structure exactly conforming to the toothless gum area of the patient's mouth.

The invention comprises a method of casting a unitary integral assembly of prosthetic teeth, then casting a hard base of acrylic or other suitable plastic thereon, then casting a soft impression layer on the hard base with it and the prosthetic teeth in the mouth of a person so as to make an impression in the soft layer which is of uncured hardenable material, either elastomeric or such material as soft deflectably formable acrylic material which provides a soft layer, impression accurate, recess adapted to fit toothless gums of a patient. The method of the invention also relates to the lining of the soft layer of material by a hard plastic layer, both of which may be accurately formed by taking impressions in the mouth of a patient in connection with the hard base carrying the prosthetic teeth.

Accordingly, it is an object of the invention to provide very economical prosthetic dentures and methods for economically producing the same, and accurately fitting the denture to the toothless gums of a human patient.

Another object of the invention is to provide a prosthetic denture having prosthetic teeth all integral with each other and in a unitary assembly and bonded to a hard base, and wherein the hard base is provided with a toothless gum fitting recess in which an elastomeric layer is disposed and accurately impression recessed to fit said toothless gum area, and wherein means is provided for preventing food particles from becoming disposed between the hard base and the elastomeric layer.

Another object of the invention is to provide a novel method of casting a layer of hard plastic over a deflectably formable layer of a hard base denture by taking successive impressions with the deflectably formable layer and the hard plastic layer, and wherein the hard plastic layer is encapsulated over the elastomeric layer and bonded to the base denture thereover.

Another object of the invention is to provide a method for producing prosthetic dentures wherein a hard base prosthetic gum structure is bonded to an assembly of prosthetic teeth; a soft layer is bonded to the hard base and is of deflectably formable material subject to thermal setting action or the like and whereby the deflectably formable layer is located in a person's mouth and deflected into close fitting relation with the toothless gum area thereof and is then cooled and hardenable material is placed on the soft layer and reinserted in the mouth and allowed to cure into a hard impression fitted liner.

Further objects and advantages of the invention may be apparent from the following specification, appended claims and accompanying drawings.

BRIEF DESCRIPTION OF THE DRAWINGS

FIG. 5 is an enlarged fragmentary sectional view showing the assembly of prosthetic teeth disclosed in FIG. 1 of the drawings in a resilient mold, and showing a hard base structure cast into bonded relationship with the prosthetic teeth;

FIG. 6 is the result of the steps shown in FIG. 5 of the drawings, illustrating an assembly of prosthetic teeth with a hard base structure cast thereon and having a recess generally adapted to receive the toothless gum area of a human patient;

FIG. 7 is an enlarged fragmentary sectional view taken from the line 7—7 of FIG. 6 and showing the addition of an elastomeric layer of material formed by the impression process in the recess of the hard base structure shown in FIG. 6;

FIG. 8 is a view similar to FIG. 7 but showing a modification of the invention wherein a hard plastic layer is impression formed over an elastomeric layer such as shown in FIG. 7 of the drawings and wherein the hard plastic layer is bonded to the hard base which is cast onto the assembly of prosthetic teeth, as shown in the illustration of FIG. 5;

FIG. 9 is a further modification of the invention wherein an elastomeric layer of material is disposed on the outer perimeter portions of the hard base structure shown in FIG. 6 of the drawings and wherein a layer of hardenable plastic is impression formed in the recess of the hard base material and this hard plastic layer is retained in place by said elastomeric material in surrounding relation with the hard base structure whereby the elastomeric material holds the hardenable layer in place during the taking of an impression in a person's mouth and during the curing thereof into a shape conforming with the toothless gums of the patient;

DESCRIPTION OF THE PREFERRED EMBODIMENTS

Figure 1:
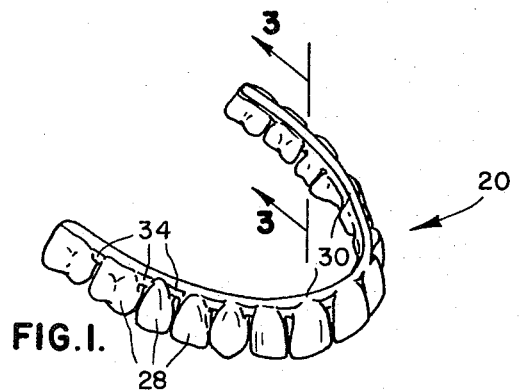
FIG. 1 is a perspective view of an assembly of prosthetic teeth all formed of one casting and integral with each other.

As shown in FIG. 1 of the drawings, a U-shaped assembly of artificial teeth designated 20 is cast or otherwise formed so as to provide a substantially rigid U-shaped assembly of prosthetic teeth onto which a hard base may be subsequently cast or bonded. The assembly of prosthetic teeth 20 is preferably cast or formed in a mold having two parts 22 and 24 which are readily separable and these parts may be made of various resilient materials capable of being separated to provide relief for the removal of the assembly 20 from the mold formed by the two parts which separate at 26.

Figure 2:
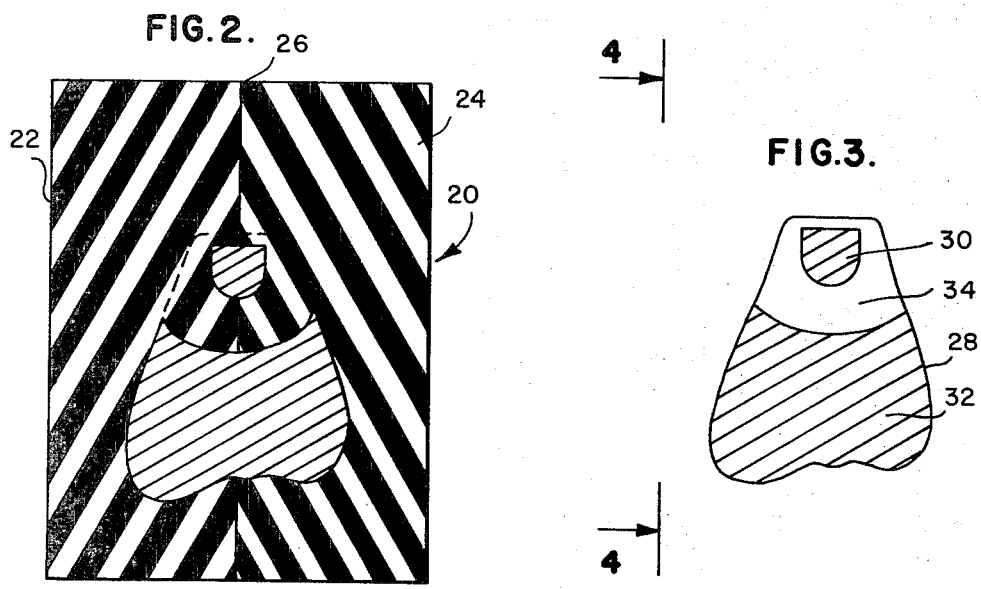
FIG. 2 is an enlarged transverse sectional view taken from the line 2—2 of FIG. 1, showing a mold structure in surrounding relationship with prosthetic teeth and showing the manner in which the assembly of FIG. 1 is cast in a resilient mold.
Figure 3:
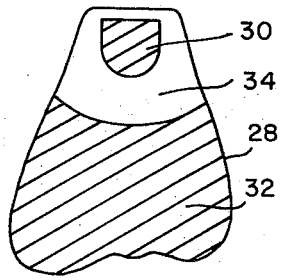
FIG. 3 is a sectional view taken from the line 3—3 of FIG. 1, showing the structure of the prosthetic tooth assembly on a large scale.
Figure 4:
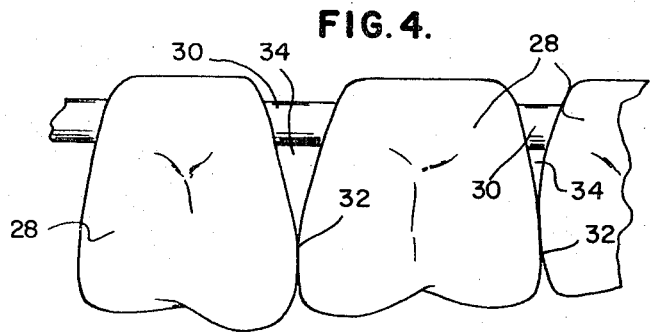
FIG. 4 is a fragmentary side elevational view of an assembly of prosthetic teeth taken from the line 4—4 of FIG. 3.
Figure 12:
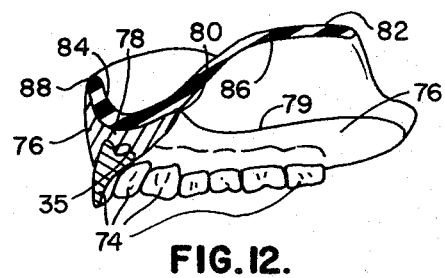
FIG. 12 is a sectional view taken from the line 12—12 of FIG. 10.
Figure 13:
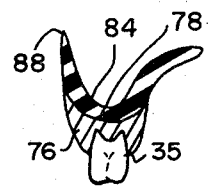
FIG. 13 is a sectional view taken from the line 13—13 of FIG. 10.

It will be appreciated that other methods may be employed to assemble an integral group of prosthetic teeth or a set of individual prosthetic teeth into a generally U-shaped assembly and generally conforming to the usual disposition of mandiblary and/or maxillary teeth arrangements. As shown in FIGS. 1, 3 and 4 of the drawings, the individual prosthetic teeth 28 are interconnected by an integral bar 30 which is cast integral therewith and the teeth 28, as well as the bar 30, may be made of acrylic plastic material or any other suitable material as desired. The prosthetic teeth 28 are integral with each other at adjacent areas 32 all as shown best in FIGS. 3 and 4 of the drawings. The prosthetic teeth are provided with substantially conventional incisor and crown areas and also second areas 35. The second areas 35 are cast into and bonded to the hard base, as will be hereinafter described. Immediately above the area 32 and below the bar 30, a generally wedge shaped opening 34 is provided between each of the prosthetic teeth 28 so as to afford an anchor area for hard base material to be cast around or bonded around said second area or upper portions 35 of the prosthetic teeth 28, as shown in FIGS. 12 and 13 of the drawings, and as will be hereinafter described in detail. After the U-shaped assembly of integral prosthetic teeth 28 has been cast, as shown in FIGS. 1 and 2 of the drawings, the hard base plastic material may be cast around the normally upper or base portions of the prosthetic teeth 28 so as to cast or mold the hard base material in the openings 34 and below the respective bar portions 30 which extend between the teeth 28 as shown in FIG. 24 of the drawings. Thus, the base material may be firmly and securely anchored to the U-shaped assembly 20 of prosthetic teeth 28.

The U-shaped assembly 20, as shown in FIG. 5 of the drawings, is placed in a separable mold having two portions 36 and 38, separable along a line 40, and this mold is provided with a cavity area 42 adapted for forming a hard base 44 around the bar 30 and the base portions of the prosthetic teeth 28, and the portion 36 of the mold is provided with a mold portion 46 adapted to form a recess generally to fit the gum area of the maxillary ridge of a human mouth, and it will be obvious that molds similar to the molds 36 and 38 may be used to form a hard base such as the base 44 to fit the mandiblary ridge and the toothless gum area thereon and therefore only the artificial denture for fitting the maxillary ridge is disclosed herein.

As shown in FIG. 5 of the drawings, it will be seen that the hard base 44 is cast in the openings 34 around the bar 30 in order to fully anchor the hard base 44 onto the assembly 20 of integral prosthetic teeth 28.

As an alternate method, individual prosthetic teeth may be placed in a mold such as shown in FIG. 5 and the hard base 44 may be cast against and bonded to the second areas 35 of the prosthetic teeth.

The hard base 44 may be made of any suitable material such as acrylic plastic or the like and when the prosthetic teeth 28, together with the base 44, are removed from the mold structures 36 and 38, the base 44 together with the prosthetic teeth 28 may appear as a unitary structure as shown in FIG. 6 of the drawings. This unitary structure, at the upper portion of the base 44, is provided with a recess 48 formed by the portion 46 of the mold 36 and this recess 48 is generally formed to loosely fit the mandiblary ridge area occupied by the toothless gum of the human mouth.

The hard base 44, with the prosthetic teeth 28, as shown in FIG. 7, may then be inserted into a person's mouth with a layer of uncured elastomeric or deflectably formable material 50 resting in the U-shaped recess 48 and when inserted in the patient's mouth the toothless gum area over the mandiblary ridge may be impressed into the soft uncured elastomeric material to form an impression recess 52 which precisely conforms with the toothless gum area over the maxillary ridge and thus final fitting of the denture, as shown in FIG. 7, may be accomplished.

The hard base 44 is provided with an interlocking recess 54 near the peripheral or marginal edge portion 56 thereof, and the uncured elastomeric material is impression formed into the groove 54 so that an interlocking portion 58 thereof is interlocked in the groove 54 and after the elastomeric material has been cured, the marginal edge 60 may be cemented to the marginal edge 56 of the hard denture 44 by epoxy or other material so as to prevent the entrance of food particles therebetween.

It will be understood that the elastomeric material 50 may be impression formed in the mouth and cured therein or may be removed after the impression is taken in order to complete the curing of the elastomeric material after the prosthetic denture has been removed from the patient's mouth.

A species of the invention as shown in FIG. 8 comprises the assembly of prosthetic teeth 28 bonded to the hard base 44 as hereinbefore described, and a layer of elastomeric material designated 62 is similar to the layer 50 hereinbefore described, and a marginal edge 64 of the elastomeric layer 62 is trimmed back from the marginal edge 56 of the hard base 44, and a second layer of hardenable plastic material 66 is placed over the elastomeric layer 62 and inserted in the human mouth so that an impression recess 68 may be formed in the hardenable plastic 66 closely to conform to the maxillary ridge area and the toothless gum area thereover.

In the structure shown in FIG. 8, the layer of hardenable plastic material 66 extends over the cut back edge 64 of the elastomeric layer 62 and a portion 70 of the layer 66 extends over the marginal edge portion 56 of the hard base 44, and is bonded thereto, so as to cover the marginal edge 64 of the elastomeric layer 62 and thereby completely to encapsulate it and prevent any entrance of food particles between it and the hard base 44.

It will be understood that the hardenable plastic material 66 may be acrylic and may ultimately cure to a hardness comparable to that of the hard base 44 and thus the soft elastomeric layer 62 preliminarily impression formed in the recess 48 serves as a support for holding the hardenable layer 66 of plastic material until it has been impression formed and partially hardened so that it may readily be removed from the patient's mouth and thereafter cured to a completely hardened state which is substantially harder than the elastomeric layer 62 and comparable to the hardness of the hard base 44 and the prosthetic teeth 28. It will be understood that the layer 66 may be made of acrylic material, if desired.

As shown in FIG. 9 of the drawings, the hard base 44 carrying the prosthetic teeth 28 may be provided with a layer of hardenable acrylic material designated 72 and this layer initially may be uncured and carried in the recess 48 of the hard base 44. It may then be placed in a person's mouth while a surrounding band of elastomeric material 74 covers the marginal edge 56 of the hard base 44 for retaining the uncured layer of plastic material 72 while the impression is taken relative to the toothless gum area over the maxillary ridge, and when the impression is taken the entire assembly may be removed from the mouth so that the impression taken in the layer 72 may be cured while the elastomeric band 74 holds the peripheral portion of the plastic 72 and then after the plastic layer 72 has cured, the elastomeric layer 74 may be stripped away to expose the marginal edge 56 of the hard base 44.

It will be understood that the layer 72, being made of acrylic or other material, will bond very closely and tenaciously to the hard base 44 and will therefore be sealed against the entry of food particles between the layer and the base.

The assembly 20 of prosthetic teeth 28 may be made of Celcon Acetal Copolymer M270-04. This material is manufactured by Union Carbide Corporation, 270 Park Avenue, New York, N.Y. The foregoing is merely an example of the type of material which may be used to produce the prosthetic teeth 28 in their integral generally U-shaped assembly 20.

The relatively hard base 44, as hereinbefore described, is preferably made of an ethylene-vinyl acetate copolymer and this resin is known as EVA 507 and is also manufactured by Union Carbide Corporation, above referred to.

The soft elastomeric or deflectably formable material 52 and 62, hereinbefore referred to, is known as "Truliner", manufactured by Harry T. Bosworth Company, Chicago, Ill., or "Flexa-Cryl" as manufactured by Langs Corporation, 820 W. Montrose, Chicago, Ill., or "Coe-Soft" as manufactured by Coe Laboratories, East Chicago, Ill.

The dentures of the invention, as disclosed in FIGS. 7, 8 and 9, are different species, all having various advantages in the manufacture and fitting of prosthetic dentures, and in accordance with the method of the invention the casting of the assembly of teeth 20, all integral with each other, and then the casting of the hard base 44 thereon, in interlocking relation therewith, and then the final impression fitting of the denture to a toothless gum area of a person's mouth may be accomplished as described in connection with FIGS. 7, 8 and 9. The soft elastomeric layer 52 shown in FIG. 7 may be a final impression fitting accomplished by impression fitting in the mouth, and the secondary method for producing the denture as shown in FIG. 8 of the drawings encloses the casting of the teeth and then the base 44 thereon, then the elastomeric layer 62 is impression fitted on the toothless gum area of the patient's mouth, and then the hardenable hard plastic 66 is impression fitted in the person's mouth on the toothless gum area, preliminary to hardening thereof, and then it is removed and allowed to harden while the peripheral edge 56 of the hard base 44 is bonded to the peripheral portion 70 of the hard layer 66 after it is impression formed and cure hardened. In the method as shown in FIG. 9, the elastomeric strip 74 is formed on the periphery of the hard base 44 so as to hold and retain marginal edge portions of the hardenable layer 72 of the plastic material which ultimately bonds to the base 44 and is relatively hard material as compared to the elastomeric band 74 which is stripped from the hard base material 44 after the layer 72 has cured into an impression configuration following the removal thereof from the person's mouth after taking an impression.

The assembly 20 of the integral prosthetic teeth 28 may be provided with the hard base 44 as described in connection with FIG. 5 of the drawings, and thereafter the artificial denture of the invention may either be fitted by the patient himself or fitted by a dentist in accordance with the teachings described in connection with FIGS. 7, 8 or 9, depending upon the method which is desired to be used and whether or not a soft elastomeric liner adjacent the toothless gum area and over the maxillary or mandiblary ridges is desired. The bonding of the peripheral edges of the elastomeric layer 52 to the hard base 44 by an epoxy effectively prevents the entrance of material between the hard base and the soft liner, and the methods shown in FIGS. 8 and 9 provide for a hard impression liner precisely fitted to the toothless gum area and impression formed so that a hard liner may be provided if desired, and all of these may either be performed by a patient or by a dental technician or dentist in such a manner as to provide ultimate economy and very accurate fitting of prosthetic dentures to a person's mouth.

Figure 10:
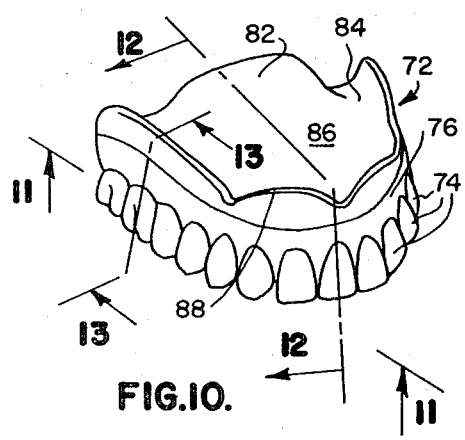
FIG. 10 is a view similar to FIG. 6 but showing a preferred embodiment of the invention.
Figure 11:
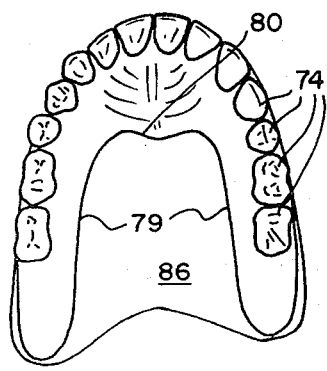
FIG. 11 is a bottom plan view of the denture shown in FIG. 10 and taken from the line 11—11 of FIG. 10.

The preferred embodiment of the invention comprises a prosthetic denture such as shown in FIG. 10 of the drawings. This prosthetic denture is designated generally 72 and as shown in FIGS. 11 and 12, an assembly of prosthetic teeth 74 are cast into and bonded to a hard base structure 76. The prosthetic teeth 74 and the hard base structure 76 are preferably of an acrylic material such as manufactured by Coe Laboratories, Inc., Chicago, Ill. 60658. Also, this hard base material may be such as manufactured by Cosmos Dental Products, Inc., 4330 22nd Street, Long Island City, N.Y. Thus the preferred form of the invention includes a hard base prosthetic gum structure 76 to which are bonded an assembly of prosthetic teeth 74 and this hard base and assembly may be molded in a similar manner as shown in FIG. 5 wherein a generally U-shaped recess 78 is formed generally to correspond and coextend with a toothless gum area of a patient. As shown in FIGS. 10, 11 and 12, the central area 79 of the hard base 76 is generally open and is provided with a terminus 80 located a short distance behind the incisor or front teeth and thus the hard base 76 is generally U-shaped, all as shown best in FIGS. 11 and 12.

Bonded to the hard base 76 is a soft deflectable layer 82 and this layer 82 is made of material compatible with the material of the hard base 76 and preferably of deflectably formable acrylic material such as the "Super Soft" acrylic manufactured by Coe Laboratories, Inc., hereinbefore referred to. Additionally, such soft deflectable material is manufactured by William Getz Corporation, Chicago, Ill.

Accordingly, the soft layer 82 is bonded to the U-shaped recess 78 of the hard base 76 and the soft layer 82 is provided with a U-shaped recess 84 which is adapted generally to fit a toothless gum area of a patient and is generally coextensive with the assembly of prosthetic teeth 74. The soft layer 82 is provided with a palatal vault palate portion 86 which abridges the open area 79 of the hard base 76, all as shown best in FIGS. 11, 12 and 14. The soft layer 82 is provided with a rim 88 generally surrounding the recess 84 and the denture as shown in FIGS. 10, 11 and 12 may be produced in a variety of sizes such that the recess 84 may generally fit various patients.

Figure 14:
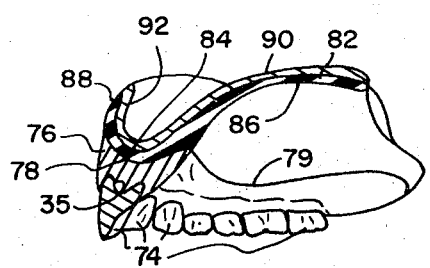
FIG. 14 is a view similar to FIG. 12 but showing a hard liner bonded to the soft deflectable layer of material shown in FIG. 12.
Figure 15:
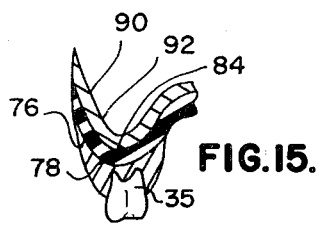
FIG. 15 is a view similar to FIG. 13 and showing a hard liner bonded to the soft deflectably formable layer of material as shown in FIG. 13.

In accordance with the method of the invention, this denture as shown in FIGS. 10, 11 and 12 may be fitted to a patient's mouth as follows, and the structure may be completed as shown in FIGS. 14 and 15, in the following manner and in accordance with the method of the invention.

An artificial denture, such as shown in FIG. 12 of the appropriate size generally to fit a patient's toothless gum area, is selected and the soft layer 82 which is deflectably formable is heated in hot water or the like to render it readily pliable and thermal settable. The denture is then placed in the patient's mouth and the rim 88 of the soft layer 82 is deflectably formed into close conformance with the toothless gum area of the patient while the palatal vault palate portion 86 is formed upwardly into intimate contact with the palatal vault of the patient's mouth, and then the denture is removed and the soft layer 82 is chilled and a hard liner material designated 90 in FIGS. 14 and 15 is placed on the soft layer 82. This material 90 is similar to the hard acrylic material of the hard base 76 and is initially placed on the soft layer in uncured form such that it is substantially fluid in condition. The denture is then placed in the patient's mouth to impression form the hard liner 90 to provide a generally U-shaped recess 92 which exactly conforms as an impression fitting to the toothless gum area of the patient, and this hard liner 90 is then allowed to harden and cure into exact conformance with the toothless gum area.

Accordingly, the liner 90 is very thin at the palatal vault area 86 due to the fact that the portion 86 of the soft layer 82 was previously formed into close intimate contact with the palatal vault of the patient's mouth, and thus the hard liner 90 may be very thin, yet rigid and bonded to the palatal vault or hard palate portion 86 of the soft layer 82.

It will be appreciated that the soft layer 82 may have characteristics which allow it gradually to harden over a period of several days or a month, such that it eventually becomes quite hard and comparable to that of the hard base 76 and the hard liner 90.

It will be appreciated that the structure of the invention and the method hereinbefore recited provides substantial advantage in fitting the palatal vault of the patient's mouth due to the fact that the hard base 76 is open in the middle portion of the upper prosthetic denture, all as indicated at 79 in FIGS. 11 and 12 of the drawings, and the soft layer 82 abridges this opening rearward of the terminus 80 so that the palatal vault area of the mouth may readily be fitted by deflecting the soft deflectably formable material of the layer 82 into close conformity with the palatal vault and the thickness of the material of the soft layer at this point may be nominal, and also the thickness of the hard liner 90 may be nominal thereafter due to the fact that the soft layer has been previously deflectably formed into close conformity with the features of the patient's mouth.

It will be appreciated that the hard liner 90 is of material which bonds to the soft layer 82. The hard liner is made of material, as for example the material made by the Coe Laboratories hereinbefore referred to, and the product is known as "Coe-Rect". This is a rigid denture liner known to the dental profession. Also, the Cosmos company, hereinbefore referred to, produces a methyl methacrylate base material and these materials are all generally acrylic so that they are compatible in chemistry to efficient bonding to each other. The soft material of the soft layer 82, being deflectably formable at temperatures ranging between body temperature and 160°, may be suitably heated to a comfortable degree for impression forming in the person's mouth, as hereinbefore described, preliminary to the casting and impression forming of the hard liner 90 on the soft layer 82.

It will be obvious to those skilled in the art that various modifications may be resorted to without departing from the spirit of the invention.

I claim:

1. In an artificial denture, the combination of: a generally U-shaped assembly of hard prosthetic teeth; said assembly having crown and incisor areas, and second areas adapted to be fixed in a prosthetic gum structure; a permanent substantially rigid hard prosthetic generally U-shaped base gum structure bonded to said second areas of said teeth; said prosthetic base structure having a generally U-shaped in cross section recess coextensive with said assembly of teeth and adapted generally to receive a toothless human gum area; and a layer of soft deflectibly formable material having marginal edges and a recess shaped generally to fit a toothless gum area; and peripheral areas of said prosthetic base structure and said marginal areas of said deflectibly formable layer sealingly coupled to prevent food particles from entering therebetween; said denture being provided with a palatal vault portion disposed rearwardly of said terminus portion; said palatal vault portion abridging a central area between side portions of said U-shaped base structure; said palatal vault portion formed only of deflectibly formable material and capable of being easily deflectibly formed upwardly and set into closely conforming relation with any one of a variety of different palatal vault areas of human mouths for preliminary impression forming of said deflectibly formably layer in any one of several different human mouths.

2. The invention as defined in claim 1 wherein: a liner of hard material having impression fitting configuration relative to a human palatal vault area is bonded to said deflectibly formable layer in conformance with an impression configuration thereof.

3. A method for producing an artificial denture, comprising: forming a generally U-shaped assembly of hard prosthetic teeth bonding a permanent generally U-shaped hard base structure to said assembly of hard prosthetic teeth and providing a terminus of said hard base structure disposed a short distance rearwardly of the incisor areas of said assembly of said prosthetic teeth; bonding a soft deflectibly formable layer onto said permanent hard base and extending said deflectibly formable layer over a palatal vault area so as to abridge said U-shaped base rearwardly of said terminus to provide a soft deflectibly formable palate vault portion bonded to said base; inserting said base and deflectibly formable layer into a patient's mouth and deflectibly forming said deflectibly formable palate vault portion into close proximity to the palatal vault area of the patient's mouth and deflectibly forming remaining portions of said layer into close proximity to a toothless gum area of a patient's mouth, then removing the denture and placing an uncured hardenably hard liner material, in fluid form, on the soft deflectibly formable layer, then reinserting the denture into the human mouth and impression forming the hard uncured material into an impression conformance with the palatal vault and the toothless gum area of the patient's mouth and allowing the uncured hardenable liner to harden over the deflectibly formable layer and to bond thereto, to form a rigid liner which conforms intimately to the features of the palatal vault area and the toothless gum area of the mouth.

4. The invention as defined in claim 3 wherein said soft deflectibly formable layer is heated before insertion in the patient's mouth to allow ease of deflectible forming of said layer including said palatal vault portion into close conformity to the features of the person's mouth.

5. In an artificial denture, the combination of: a generally U-shaped assembly of hard prosthetic teeth; said assembly having crown and incisor areas, and second areas adapted to be fixed in a prosthetic gum structure; a permanent substantially rigid hard prosthetic generally U-shaped gum structure bonded to said second areas of said teeth; said prosthetic base structure having a generally U-shaped in cross section recess coextensive with said assembly of teeth and adapted generally to receive a toothless human gum area; and a layer of soft deflectibly formable material in said U-shaped recess, said deflectibly formable material having marginal edges and a recess shaped generally to fit a toothless gum area; and peripheral areas of said deflectibly formable area sealingly coupled to prevent food particles from entering therebetween; said base structure extending and having a terminus portion disposed a short distance rearwardly relative to the foremost or incisor teeth of said assembly; said deflectibly formable material faired into said terminus portion of said hard base material to form a smooth transitory surface in said palatal vault area at a lower surface which is disposed to be adjacent the human tongue; said denture being provided with a palatal vault portion disposed rearwardly of said terminus portion, said palatal vault portion abridging a central area between side portions of said U-shaped base structure; said palatal vault portion formed only of deflectibly formably material and capable of being easily deflectibly formed upwardly and set into closely conforming relation with any one of a variety of different palatal vault areas of human mouths for preliminary impression forming of said deflectibly formable layer in any one of several different human mouths.

* * * * *